Nov. 21, 1961 F. OSTWALD 3,009,524
AUXILIARY HYDRAULIC POWER STEERING DEVICE
Filed Nov. 18, 1957 2 Sheets-Sheet 1
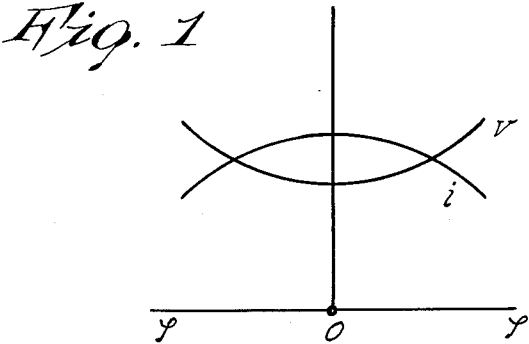
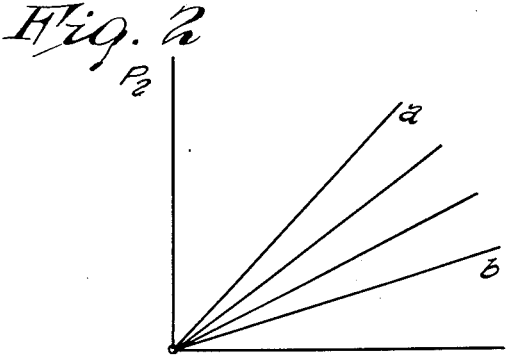
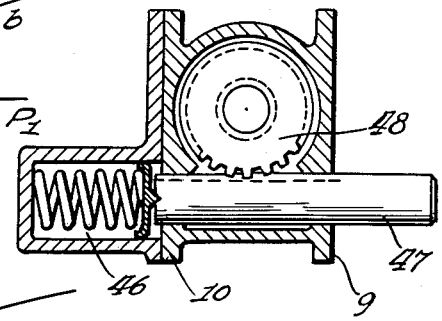
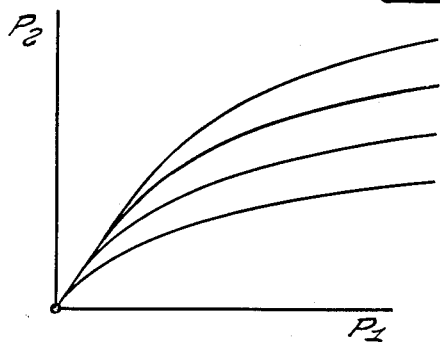
INVENTOR.
FRITZ OSTWALD
BY
Mestern & Kollin
ATTORNEYS

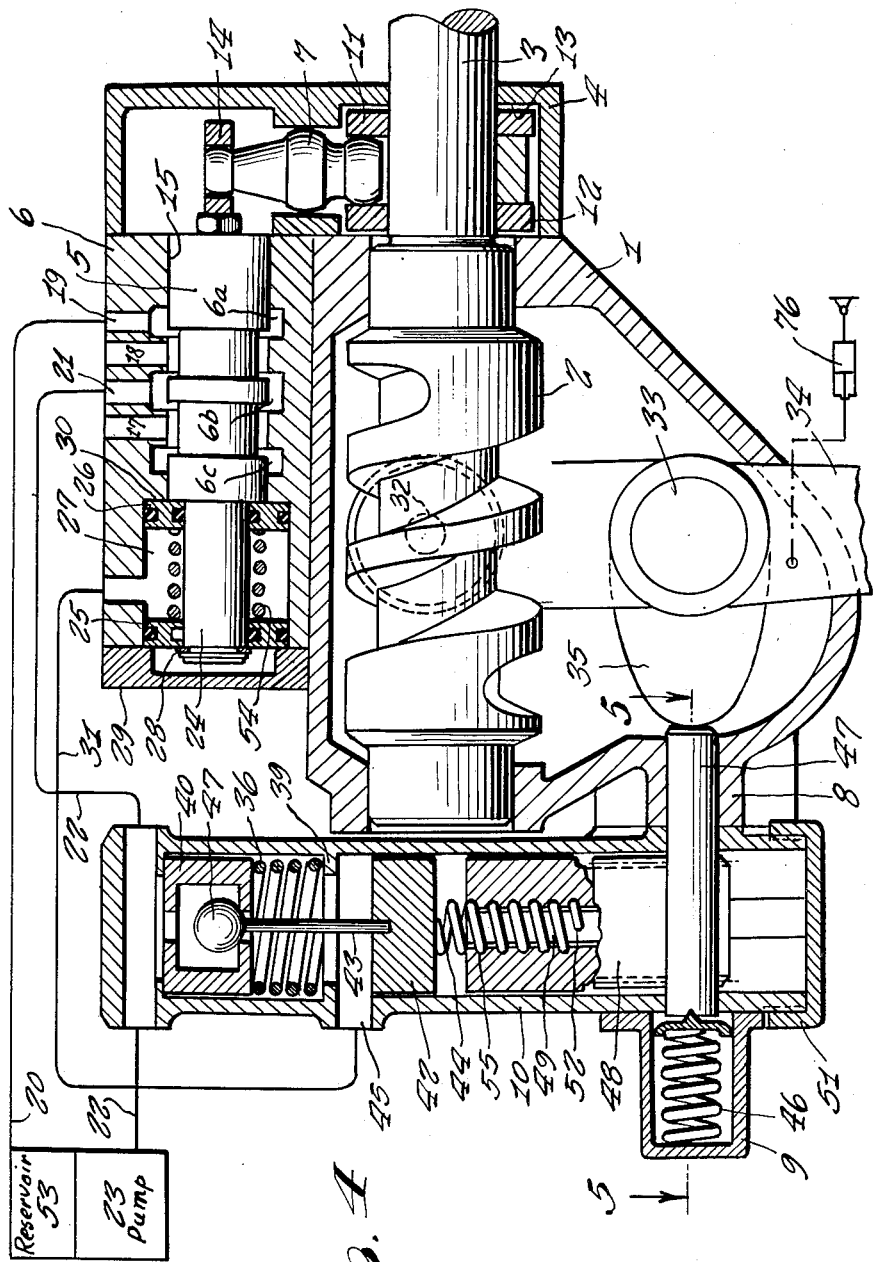

United States Patent Office 3,009,524
Patented Nov. 21, 1961.

3,009,524
AUXILIARY HYDRAULIC POWER
STEERING DEVICE
Fritz Ostwald, Buchschlag, Germany, assignor, by mesne assignments, to Zahnradfabrik Friedrichshafen A.G., Friedrichshafen, Germany
Filed Nov. 18, 1957, Ser. No. 697,248
Claims priority, application Germany Dec. 8, 1956
7 Claims. (Cl. 180—79.2)

The present invention relates to an auxiliary hydraulic power steering device, particularly for vehicles.

It is a known characteristic of servo power steering mechanisms that, over the range of angular displacement of the steering wheel, the mechanical transmission ratio varies independently of the power-boosting ratio. The power-boosting ratio of an auxiliary power steering device is considered as the ratio of the forces at the steering knuckle with and without application of the power booster, respectively, and with the same manual steering effort. The transmission ratio, on the other hand, is defined as the ratio of the turning angles of the steering-arm shaft and of the steering-wheel shaft or the ratio of the forces acting on the two shafts when no booster power is applied. Thus, the power-boosting ratio is changed in response to the magnitude of the steering force, or to the steering resistance, whereas the mechanical transmission ratio may either be constant or vary with the turning angle of the steering linkage. In the latter instance, the transmission ratio has either a maximum or a minimum at the center of the operating range of the steering system while decreasing or increasing toward the extremities of the range.

It is the object of the present invention to provide a hydraulic steering device in which the power-boosting ratio does not depend solely on the steering power or on the steering resistance but can be selectively adjusted either manually or automatically. In the latter case, according to a feature of the invention, an adjustable pressure regulator is linked with the mechanical steering mechanism or with an integral part thereof. The power-boosting ratio can then be influenced automatically in dependence upon the angular setting of the steering shaft.

According to a more particular feature of the invention, the desired alteration of the power-boosting ratio is so controlled as to compensate for the aforedescribed dependence of the mechanical transmission ratio on the steering angle. Thus, if this ratio is a maximum at the center position of the steering mechanism but falls off with increasing turning angle either to the right or to the left, the power-boosting ratio is low at the center and increases toward the limits of the range. Such an alteration of the power-boosting ratio has the effect that in the central steering area hardly any additional force on the part of the driver is required even if the auxiliary power should fail, so that safety in driving is assured. When for travel on winding mountain roads or for parking maneuvers large steering angles are required, the power-booster ratio is increased so that no excessive manual exertion is required despite the greatly decreasing mechanical transmission ratio in that range.

To attain this effect in a highly expeditious manner, the fluid-actuated surfaces of the usual centering control valve of the servo system are subjected to a pressure which is reduced from the output pressure of a supply pump by the adjustable pressure regulator. The magnitude of the reduced pressure acting on these surfaces then depends upon the reduction ratio of the manually or automatically adjustable regulator which advantageously includes a spring whose effective force can be selectively varied, e.g. by changing its effective length.

The invention will now be described in detail with reference to the accompanying drawing in which:

FIG. 1 is a graph of the power-boosting and transmission ratios of a conventional power steering system, plotted against the angle of the steering-gear arm;

FIG. 2 is a set of graphs illustrating the response of an adjustable pressure regulator with linear characteristic;

FIG. 3 is a similar set of graphs relating to an adjustable pressure regulator with non-linear characteristic;

FIG. 4 is a partly diagrammatical cross-sectional view of an entire steering mechanism embodying the invention; and FIG. 5 is a cross-sectional view taken on line 5—5 of FIG. 4.

FIG. 1 illustrates the variations of the power-boosting ratio V and of the transmission ratio $i$ with changes in the turning angle of the steering arm as encountered in a typical vehicular power steering system. It is apparent that the transmission ratio $i$ attains a maximum in the center position and decreases toward the extreme positions, while the reverse is true for the power-boosting ratio V.

FIG. 2 illustrates the relation between the input and output pressures ($p_1$ and $p_2$) of a linear pressure regulator. The different lines correspond to different regulator settings.

FIG. 3 shows corresponding curves of a similar pressure regulator whose characteristic is non-linear.

In FIG. 4 there is shown a steering device for vehicles in which a worm 2 of limited axial mobility, rotatable by means of a steering shaft 3 connected therewith, acts on a control valve 6 of a servo mechanism within a housing 1. An extension 4 of housing 1 contains a transmission lever 7 which actuates the piston 5 of control valve 6. Also attached to housing 1 is a flange 8 for guiding the governing member 47 of a pressure regulator 10. The latter, in turn, is secured to housing 1 by means of a part 9.

Steering shaft 3 carries a collar 11 which engages one end of transmission lever 7, the other end of this lever being secured in a lug 14 of piston 5. Between its ends, lever 7 is formed with a spherical bulge with which it is received in a constriction of housing extension 4. Collar 11 is held between the abutments 12 and 13 of housing portions 1 and 4 and is movable between these abutments to assure the necessary play for the actuation of valve piston 5 in response to axial displacement of worm 2 and steering shaft 3.

Piston 5 is conventional and situated in a stepped and grooved bore 15 of control valve 6. The grooves of bore 15 are connected in conventional manner to opposite sides of a working cylinder 76 and to a source of hydraulic fluid, here shown as a pump 23 and a reservoir 53, via respective ports of which four are shown at 17, 18, 19 and 21. The pump 23 discharges through a pipe 22 into port 21 and through it into the central groove 6b of bore 15; the return flow from the right-hand groove 6a and port 19 to reservoir 53 passes through a pipe 20, while the return path from the left-hand groove 6c has not been illustrated. Ports 17 and 18 are connected to cylinder 76. High-pressure pipe 22 also traverses the upper chamber of regulator 10. Bore 15 of control valve 6 is enlarged on the side remote from transmission lever 7 to form a chamber 27 accommodating a reduced extension 24 of the piston 5. Member 24 carries two sealing collars 25 and 26 which are axially movable thereon and simultaneously fit in a liquid-tight manner into the chamber 27. Collar 25 is held by a split ring 28 which fits into member 24 and, in neutral position, also abuts a cover 29 of control valve 6. The second collar 26 abuts chamber wall 30 and an adjoining shoulder of the piston. Between collars 26 and 25 a spring 54 is provided in chamber 27 which urges the collars 25, 26 against cover 29 and wall 30, respectively, to the extent permitted by the valve member 5, 24, 28 if in off-normal position, thereby tending to restore this valve member to neutral. The annular chamber 27 is connected with pump 23 by way of a pipe 31, the pressure regulator 10, and pipe 22.

A finger 32, which meshes with worm 2, is connected with a steering-knuckle shaft 33 via a steering-gear arm 34 which in turn is coupled with the piston of working cylinder 76 as schematically indicated.

The pressure regulator 10 comprises a piston-type regulating member 40 which is supported through a spring 36 by a flange 39 of the housing and is movable downwardly under fluid pressure from pipe 22. A plug 47 of member 40 is governed by a pressure rod 43 which is connected with a piston 42. The latter is biased by means of a spring 44 against the housing. A chamber 45, situated between regulating member 40 and piston 42, is connected with annular chamber 27 of control valve 6 through pipe 31.

In order to alter the characteristic of the pressure regulator 10, the effective force of biasing spring 44 in relation to the position of the steering-gear arm 34 is changed automatically in the following manner: A cam 35, which is connected to steering-knuckle shaft 33, displaces a rack constituting the control member 47. The latter is engaged by a spring 46 in the housing part 9 and meshes with a sleeve-type gear 48 (see also FIG. 5) which, in turn, is provided with an inside thread of such diameter that the sleeve can be screwed onto helical spring 44 like a nut to serve as an adjustable anchor for one of its ends. Spring 44 is axially guided by an internal bolt 49 which is connected to a cover 51 screwed onto the pressure-regulator housing. To prevent twisting of the spring, one end of the latter is held in a bore 52 of bolt 49. Rack 47 is displaced in dependence upon the position of the cam 35, jointly with gear 48 whose position determines the effective length of the spring and therefore its effective force.

The characteristics of the regulator can be chosen by the selection of the spring elements 36, 44. Spring elements with linear characteristics (FIG. 2) or with curved characteristics (FIG. 3) may be used. According to the combination selected, any desired characteristic can be given to the ratio of the pressures in the two pipes 22 and 31.

The mode of operation of the steering mechanism shown in FIGS. 4 and 5 is as follows:

When the steering wheel is turned, the steering resistance gives rise to an axial force exerted by finger 32 upon one of the flanks of worm 2. Within the range of the play allowed by abutments 12 and 13, the steering shaft 3 thus bears axially upon piston 5 by way of lever 7. Piston 5 is, accordingly, displaced whenever this axial pressure is stronger than the balancing hydraulic forces by which piston 5 is held in its neutral position illustrated in the drawing. The displacement of piston 5 requires the exertion of a manual force which is at least equal to the initial stress of spring 54 plus the force which the pump pressure exerts on the annular reaction faces of the collars 25 and 26; this pressure is a definite fraction of the delivery pressure of the pump.

At the beginning of the steering operation, with the mechanism in its center position as illustrated, the reaction surfaces of piston 5 are subjected to substantially the full pump pressure since the sleeve 48 has been screwed almost entirely onto spring 44 which therefore acquires a maximum stiffness (corresponding to graph $a$, FIG. 2). In that instance the unit works with a minimum of auxiliary power. With increasing steering angle the regulating sleeve 48 is turned by way of cam 35 and rack 47, independently of the sense of rotation, in such manner that the sleeve is unscrewed from spring 44 to release one or more of its turns and to soften the spring stiffness. The lower spring stiffness corresponds to a pressure reduction as indicated by graph $b$ of FIG. 2. Chamber 27 is thus subjected to a balancing pressure $p_2$ which is a fraction of pump pressure $p_1$ according to graph $b$, this decrease in the hydraulic restoring force resulting in an effective increase in the power-boosting ratio. Thus the desired change in the power-boosting ratio as a function of the steering angles is attained by the fact that with increasing steering angle the effective spring force of the pressure regulator is adjusted; the sense of adjustment is such as to increase the ratio of pressure reduction caused by the regulator 10 interposed between the high-pressure line 22 and the centering or reaction surfaces of the control piston 5 of valve 6.

The described adjustment of a pressure regulator so positioned could also be effected by other means, e.g. manually. The boosting effect of the servo mechanism can thereby be adapted to the prevailing driving conditions, e.g. for highway travel or for parking. Furthermore, by using pressure regulators with concave or convex spring characteristics, different relationships between manual power and power-boosting ratio can be obtained, e.g. so that the power-boosting ratio in the area of small manual effort increases more or less rapidly with the exerted manual force than in the realm of large manual effort, or vice versa. This makes it possible to attain a smoother co-operation between the manual power and the hydraulic steering system so as to avoid the distinct starting impacts of conventional servo steering mechanisms.

The insertion of a pressure regulator according to the invention into the high-pressure line between the power supply and the reaction surfaces of a servo steering device is not limited to the construction particularly disclosed herein, but may be used, in principle, with any servo steering constructions employing reaction surfaces.

What I claim is:

1. In a vehicle provided with manual steering means, hydraulic steering means adapted to supplement the action of said manual steering means, and control means for said hydraulic steering means responsive to a reaction force exerted by the operation of said manual steering means, the combination therewith of a source of fluid under pressure connected to said control means for tending to maintain same in a neutral position, adjustable regulator means interposed in the path of said fluid between said source and said control means, and coupling means linking said regulator means with said manual steering means for varying the effective magnitude by adjusting said regulator means, whereby the response of said control means is different in different positions of said manual steering means.

2. In a vehicle provided with manual steering means, hydraulic steering means adapted to supplement the action of said manual steering means, and control means for said hydraulic steering means responsive to a reaction force exerted by the operation of said manual steering means, the combination therewith of a source of fluid under pressure connected to said control means for tending to maintain same in a neutral position, regulator means interposed in the path of said fluid between said source and said control means, said regulator means including adjustable spring means for varying the effective magnitude of said pressure, and means for adjusting the effective force exerted by said spring means.

3. In a vehicle provided with manual steering means, hydraulic steering means adapted to supplement the action of said manual steering means, and control means for said hydraulic steering means responsive to a reaction force exerted by the operation of said manual steering means, the combination therewith of a source of fluid under pressure connected to said control means for tending to maintain same in a neutral position, regulator means interposed in the path of said fluid between said source and said control means, said regulator means including adjustable spring means, and coupling means linking said spring means with said manual steering means for varying the effective magnitude of said pressure by adjusting the effective force exerted by said spring means, whereby the response of said control means is different in different positions of said manual steering means.

4. The combination according to claim 3 wherein said spring means comprises a coil spring and anchor means engageable with different portions of said spring for varying the effective length thereof.

5. The combination according to claim 4 wherein said anchor means comprises an internally threaded sleeve having said spring partially screwed into it, said sleeve being rotatable relatively to said spring.

6. In a vehicle provided with manual steering means, hydraulic steering means adapted to supplement the action of said manual steering means, and control means for said hydraulic steering means responsive to a reaction force exerted by the operation of said manual steering means, the combination therewith of a source of fluid under pressure connected to said control means for tending to maintain same in a neutral position, adjustable regulator means interposed in the path of said fluid between said source and said control means, and coupling means linking said regulator means with said manual steering means for progressively adjusting said regulator means in a sense decreasing the effective magnitude of said pressure with increasing displacement of said manual steering means from a neutral position whereby the effectiveness of said control means is correspondingly increased.

7. The combination according to claim 6 wherein said regulator means comprises a spring of adjustable effective length and anchor means for said spring controlled by said coupling means for effectively lengthening said spring upon a displacement of said manual steering means from said neutral position.

References Cited in the file of this patent

UNITED STATES PATENTS

| | | |
|---|---|---|
| 2,063,937 | Kundig | Dec. 15, 1936 |
| 2,487,618 | Twyman | Nov. 8, 1949 |
| 2,506,093 | MacDuff | May 2, 1950 |
| 2,608,263 | Garrison | Aug. 26, 1952 |
| 2,679,235 | Van Meter | May 25, 1954 |